United States Patent [19]
McDonough et al.

[11] Patent Number: 6,120,262
[45] Date of Patent: Sep. 19, 2000

[54] ELECTRONIC DEVICE CONTROL SYSTEM

[75] Inventors: William B. McDonough, Huntington Beach, Calif.; David R. Lathrop, Edwardsville, Ill.

[73] Assignee: Emerson Electric Co., St. Louis, Mo.

[21] Appl. No.: 09/167,902

[22] Filed: Oct. 7, 1998

[51] Int. Cl.[7] ............................ H04Q 7/02; F21V 33/00; H02S 4/00; G05R 19/02

[52] U.S. Cl. .................... 417/424.1; 318/16; 318/256; 340/825.69; 340/825.72; 362/96; 416/5

[58] Field of Search ................... 417/44.1, 410.1, 417/423.1, 424.1, 572; 416/5, 170 R; 340/825.57, 825.62, 825.69, 825.72; 362/96; 318/16, 256

[56] References Cited

U.S. PATENT DOCUMENTS

| | | | |
|---|---|---|---|
| 4,408,150 | 10/1983 | Holston et al. | 318/779 |
| 4,716,409 | 12/1987 | Hart et al. | 340/825.22 |
| 4,719,446 | 1/1988 | Hart | 340/310 A |
| 4,818,920 | 4/1989 | Jacob | 340/825.57 X |
| 5,041,825 | 8/1991 | Hart et al. | 340/825.06 |
| 5,164,644 | 11/1992 | Hsieh | 318/284 |
| 5,187,472 | 2/1993 | Hart et al. | 340/825.69 |
| 5,189,412 | 2/1993 | Mehta et al. | 340/825.69 X |
| 5,365,154 | 11/1994 | Schneider et al. | 318/103 |
| 5,440,459 | 8/1995 | Chan | 362/96 |
| 5,541,584 | 7/1996 | Mehta et al. | 340/825.57 |
| 5,559,406 | 9/1996 | Chang | 416/5 X |
| 5,627,527 | 5/1997 | Mehta | 340/825.06 |
| 5,689,261 | 11/1997 | Mehta et al. | 341/173 |
| 5,748,074 | 5/1998 | Chomet | 340/328 |
| 5,778,077 | 7/1998 | Davidson | 340/825.72 X |
| 5,874,789 | 2/1999 | Su | 340/825.72 X |
| 5,917,425 | 6/1999 | Crimmins et al. | 340/825.72 X |

*Primary Examiner*—Tony M. Argenbright
*Attorney, Agent, or Firm*—Howrey Simon Arnold & White, LLP

[57] ABSTRACT

A control system for a device powered by an AC power source is presented. The control system includes a fixed controller adapted to be wall-mounted and powered by the AC power source. The fixed controller is also adapted to transmit control signals to the device. The control system further includes at least one movable controller adapted to be powered by a DC power source and transmit control signals to the device. In one embodiment, both movable controller and the fixed controller are adapted to transmit to the receiver via the same transmission medium, such as RF or infrared. The electronic device to be controlled may, for example, comprise a ceiling fan and associated light fixtures.

39 Claims, 5 Drawing Sheets

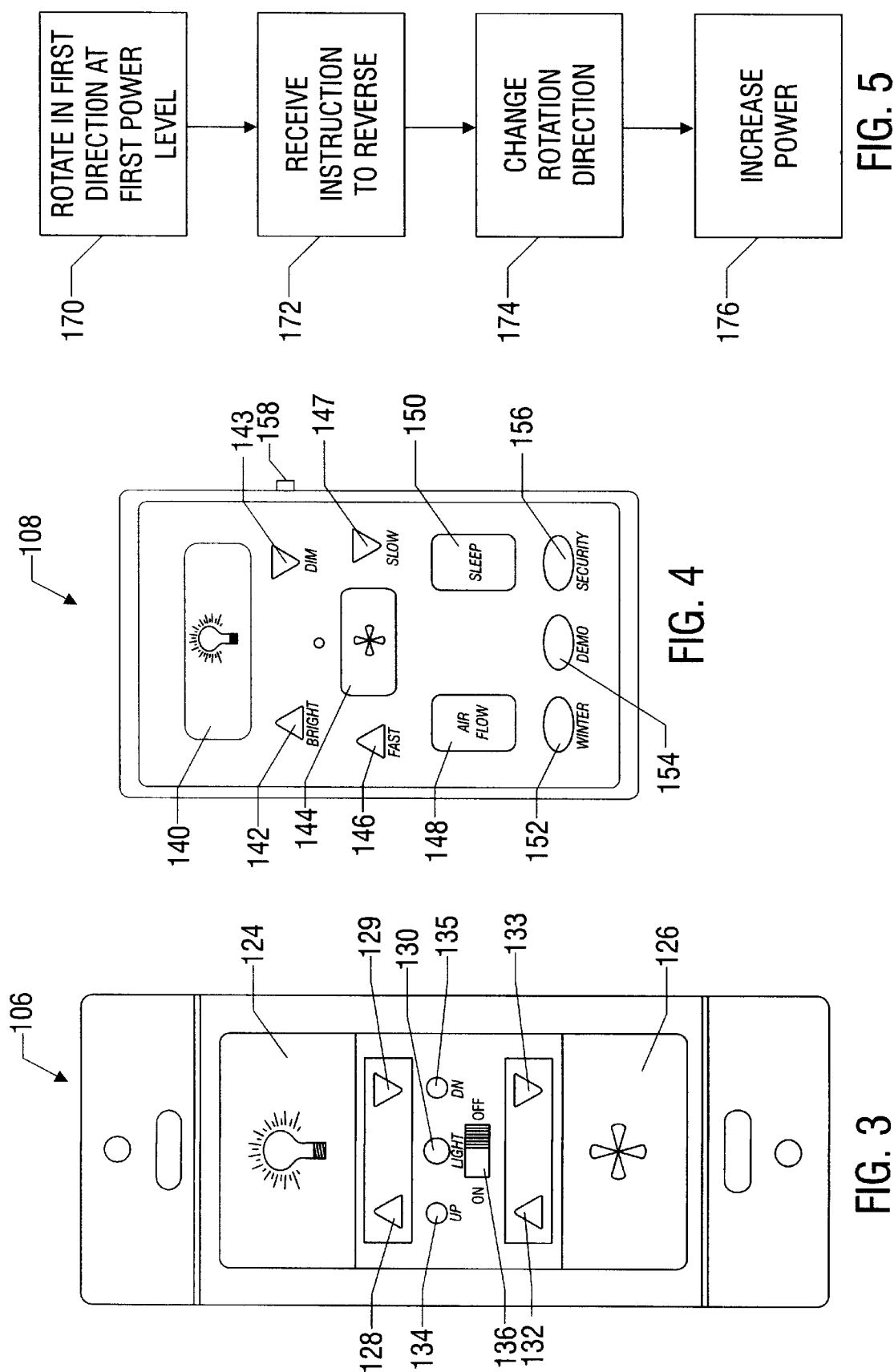

ELECTRONIC DEVICE CONTROL SYSTEM

BACKGROUND OF THE INVENTION

1. Field of the Invention

This invention relates generally to remote control systems, and more particularly, to a method and device for controlling electronic devices such as a ceiling fan and its associated light fixtures.

2. Description of Related Art

Many types of electronic devices employ remote control systems. A common application for a remote control system is an electric ceiling fan, wherein the remote control is used to vary the speed and direction of the fan operation as desired by a user. Further, ceiling fans often have one or more light fixtures incorporated therewith. Thus, it may be desirable to also control operation of the light fixtures via a remote control device.

In typical installations, ceiling fans are powered via standard household AC power via a wall switch box. Often, a ceiling fan and its associated light fixtures replaces an existing light fixture on a two-wire, switched circuit. Thus, the single wall switch controls both the ceiling fan and lights. A user often may want to turn off the light fixture, without turning off the fan. In known ceiling fans, this may be accomplished by connecting the household wiring to the fan such that the switch only controls the light fixture, and a switch operated by a pull chain controls operation of the ceiling fan. Unfortunately, in addition to being unsightly, access to pull chains is often difficult in certain ceiling fan installations, including installations on high ceilings or over furniture.

In other installations, the existing light circuit is modified, or a circuit is pre-wired for a ceiling fan and light fixture, such that both the fan and light may be controlled via wall switches sharing a common switch box. However, a typical wall switch only controls the on/off function of the ceiling fan and light fixture. Other functions, including fan direction and speed, and light intensity, must be controlled by another means, such as a pull string. This problem is expanded if the ceiling fan includes multiple light fixtures.

Prior art attempts to enhance control of ceiling fan and light control and replace pull-string switches have been largely unsatisfactory. One approach is to replace a standard wall switch with a microprocessor-based control unit. Control signals from the control unit are sent to the ceiling fan by modulating them onto the AC power line. However, such systems may reduce the AC power to the fan, causing fluctuations in the fan speed and light intensity.

Other approaches use a wireless remote control unit that may be hand held or held in a wall-mounted receptacle. Again, there are shortcomings associated with known wireless controllers. For instance, known wireless remote control units are typically battery powered. Thus, a user loses use of the remote controller, or the control functions become erratic when the battery discharges and eventually dies, which is often frustrating.

Moreover, it may be desirable to operate a single ceiling fan unit via both a wall-based switch and one or more hand held remotes. Upon entering a room, a user may wish to use the wall control to turn on the fan and lights, and adjust the light intensity and fan speed. At a later time, the user may wish to use the hand held remote to adjust the fan speed or light intensity, for example, if the temperature or light conditions have changed since entering the room. If a wall control unit sends signals via the AC power line, and the remote uses a wireless transmission, two different receivers would be required. Typical ceiling fans would not have sufficient space for housing multiple receiving units. Further, it would be difficult to coordinate control via two different systems, as this could result in conflicting commands being presented to the ceiling fan.

Similar problems exist with other remote controlled electronic devices. Thus, a need exists for an improved electronic device remote control system. The present invention addresses these and other shortcomings of the prior art.

SUMMARY OF THE INVENTION

In one aspect of the invention, a control system for a device powered by an AC power source is presented. The control system includes a fixed controller adapted to be wall-mounted and powered by the AC power source. The fixed controller is also adapted to transmit control signals to the device. The control system further includes at least one movable controller adapted to be powered by a DC power source and transmit control signals to the device. In one embodiment, both movable controller and the fixed controller are adapted to transmit to the receiver via the same transmission medium, such as RF or infrared. The electronic device to be controlled may, for example, comprise a ceiling fan and associated light fixtures.

In another aspect of the invention, a fixed controller for a ceiling fan powered by an AC power source includes a power converter adapted to receive AC power from the AC power source and supply DC power to the remote controller. A transmitter is adapted to send wireless control signals from the fixed controller to the ceiling fan. In a particular embodiment, the power converter comprises a half-wave rectifier.

In a further aspect of the invention, remote control unit for controlling a ceiling fan is presented. The ceiling fan has at least first and second light fixtures, and the remote control unit includes a switch for selecting one of the first or second light fixtures for control, and a device that indicates which one of the first or second light fixtures is being controlled.

In a still further aspect of the invention, a ceiling fan system includes a ceiling fan having a motor. The motor has a stator and a rotor adapted to rotate relative to the stator, and is adapted to be coupled to an AC power source. A plurality of blades are coupled to the rotor so as to rotate therewith. First and second light fixtures are coupled to the AC power source, and a control unit is coupled to the motor and the light fixtures. The control unit is adapted to receive control signals indicating operating parameters for the motor and light fixtures and control operation of the motor and the light fixtures in accordance with the received control signals. The ceiling fan system also includes a fixed controller that is adapted to be wall-mounted and powered by the AC power source and transmit the control signals to the receiver. At least one movable controller is adapted to be powered by a DC power source and transmit the control signals to the receiver.

In yet another aspect of the invention, a method for remotely controlling a ceiling fan including at least one light fixture includes powering the ceiling fan from an AC power source and powering a first controller from the AC power source. Control signals are transmitted from the first controller to the ceiling fan via a wireless transmission medium. One specific embodiment of the method further includes powering a second controller from a DC power source, and transmitting control signals from the second controller to the ceiling fan via the wireless transmission medium.

In another aspect of the invention, a method of controlling a ceiling fan including a motor having a stator, a rotor, and a plurality of blades mounted to the rotor so as to rotate therewith, is presented. The method includes rotating the rotor in a first direction at a first power level, receiving an instruction to rotate the rotor in a second direction, and rotating the rotor in the second direction at a second power level that is greater than the first power level.

BRIEF DESCRIPTION OF THE DRAWINGS

Other objects and advantages of the invention will become apparent upon reading the following detailed description and upon reference to the drawings in which:

FIG. 3 is a front view of a fixed controller in accordance with an embodiment of the present invention;

FIG. 4 is a front view of a movable controller in accordance with an embodiment of the present invention;

FIG. 5 is a flow diagram illustrating a method of reversing a ceiling fan blade rotation in accordance with the present invention;

Figure 1:
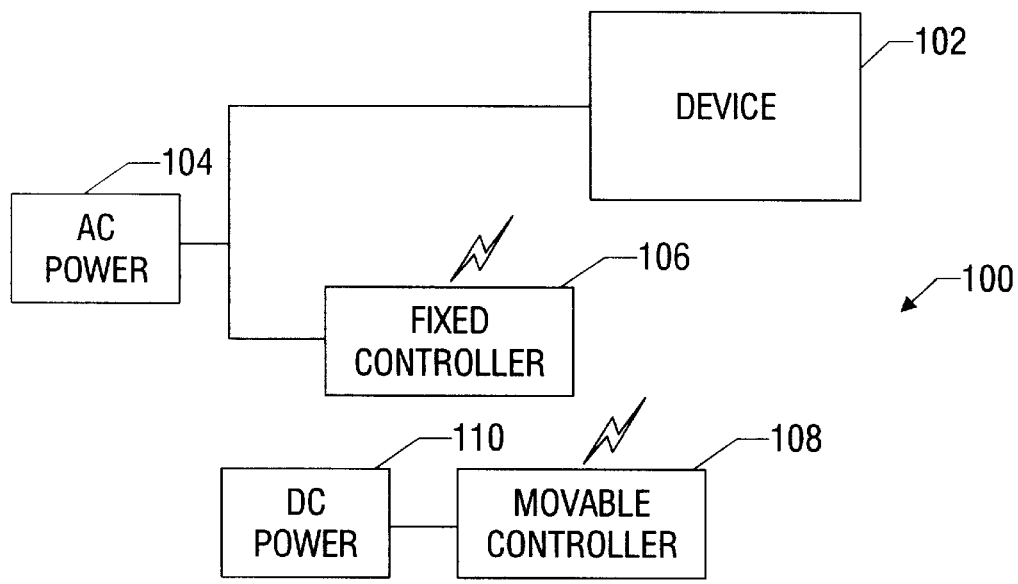
FIG. 1 is a block diagram of a control system in accordance with an embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning to FIG. 1, a block diagram of a control system 100 in accordance with an embodiment of the present invention is illustrated. The control system 100 is adapted to control a device 102 powered by an AC power source 104. A fixed controller 106, which is also powered by the AC power source 104, is adapted to transmit control signals to the device 102. At least one movable, or hand-held, controller 108 is powered by a DC power source 110, such as a battery, and is also adapted to transmit control signals to the device 108. The device 108 may include a plurality of functional units that are controlled by the movable and fixed controllers 106, 108. In an exemplary embodiment of the invention, the device 102 comprises a ceiling fan that may include one or more light fixtures. Thus, the fixed and movable controllers 106, 108 are both adapted to send control signals for operating various functions of the ceiling fan, such as fan speed and direction. Other suitable applications for the control system 100 include a garage door opener and its associated light fixtures and other components, or a home security system.

Figure 2:
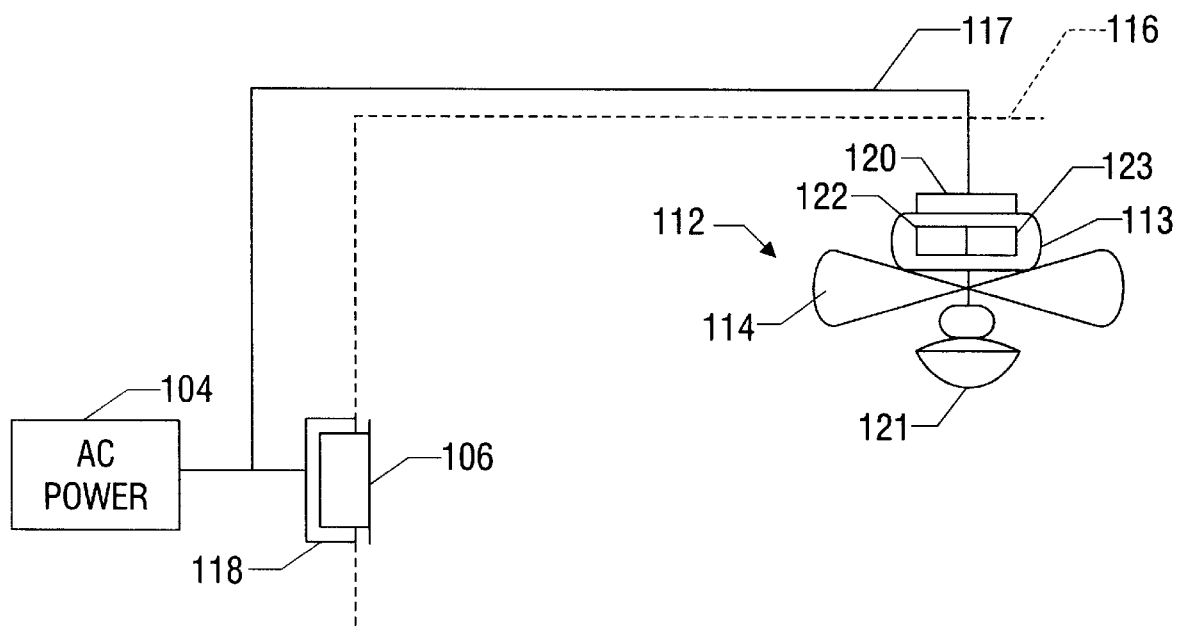
FIG. 2 is a schematic diagram illustrating portions of an embodiment of the control system of FIG. 1.

FIG. 2 schematically illustrates one particular embodiment of the invention that is configured to control a ceiling fan 112 having a motor 113 that includes a stator and a rotor (not shown). A plurality of blades 114 are coupled to the rotor of the motor 113 so as to rotate therewith. As in typical ceiling fan implementations, the ceiling fan 112 is mounted to a ceiling 116 and receives standard household AC power 104 through a pair of wires 117 via a wall box 118. The fixed controller 106 is situated in the wall box 118 and is also connected to the AC power 104. The ceiling fan 112 in the exemplary embodiment of FIG. 2 includes an up-light fixture 120 situated above the ceiling fan motor 113 so as to cast light generally above the ceiling fan 112 and a standard down-light fixture 121 situated below the ceiling fan blades 114 to cast light generally below the ceiling fan 112. Additionally, a receiver 122 adapted to receive control signals from the fixed and movable controllers 106, 108 is mounted within the ceiling fan 112 and connected to a control unit 123. The control signals indicate desired operating parameters for the ceiling fan motor 113 and light fixtures 120, 121, such as motor speed, motor rotation direction, light intensity, etc. In one particular embodiment, the fixed and movable controllers 106, 108 are adapted to transmit the control signals via the same, wireless transmission medium. For example, the fixed and movable controllers 106, 108 may both transmit to the receiver 122 via RF or infrared.

FIG. 3 and FIG. 4 illustrate exemplary embodiments of the fixed and movable controllers 106, 108, respectively, adapted for controlling a device having multiple functional units, such as the motor 113, the up-light fixture 120 and the down-light 121 of the ceiling fan 112 illustrated in FIG. 2. Both the fixed controller 106 and the movable controller 108 include an operator interface having a plurality of switches, such as push-button switches, and indicators thereon. For example, the fixed controller 106 illustrated in FIG. 3 includes a surface having first and second hinged lids 133, 134 thereon, behind which are located a plurality of operating buttons, in addition to buttons and indicators situated on the face of the controller 106. In the embodiment illustrated in FIG. 3, there are three buttons located behind the first hinged lid 133, including a light on/off button, a "winter" function button and a "sleep" function button (not shown). Further, three buttons are located behind the second hinged lid 134, including a fan on/off button, a fan reverse button, and a "security" function button.

The first hinged lid 133 is configured such that the light on/off button may be activated by pushing the first hinged lid 133. Similarly, the second hinged lid is configured such that the fan on/off button may be activated by pushing the second hinged lid 134. The remaining buttons located behind the first and second hinged lids 133, 134 are typically used only occasionally. Positioning these buttons behind the first and second hinged lids 133, 134, and using the first and second hinged lids 133, 134 to activate the more frequently utilized light and fan on/off buttons reduces the number of visible switches located on the face of the fixed controller 106. Moreover, since the fixed controller is adapted to fit within a standard wall electrical box, the space available for buttons and indicators is limited. Positioning some control buttons behind the first and second hinged lids allows placing more switches and indicators in the limited space available on the fixed controller 106. Operating buttons located on the face of the fixed controller 106 include light intensity increase and decrease buttons 135, 129, an up/down light control button 136, and fan speed increase and decrease buttons 132, 133. Still further, the fixed controller 106 includes up and down light indicators 134, 135 and a master on/off switch 136.

The exemplary movable controller 108 illustrated in FIG. 4 includes a plurality of buttons and indicators that generally correspond to those included on the fixed controller 106. Operator buttons on the particular embodiment of the movable controller 108 include a light on/off button 140, light intensity increase and decrease buttons 142, 143, a fan on/off button 144, fan speed increase and decrease buttons 146, 147, a fan reverse button 148, a "sleep" function button 150, a "winter" function button 152, a "demo" function button 154, a "security" function button 156 and an up/down light select switch 158. In one embodiment, the "demo" button 154 causes the fan 112 to cycle through its various settings to demonstrate the features of the fan 112.

The functions associated with the various buttons and indicators will be disclosed in further detail herein below. The particular operator buttons and indicators included on the fixed and movable controllers 106, 108, and the specific arrangement thereof, are not essential to implementing the invention. The embodiments of the fixed and movable controllers 106, 108 illustrated in FIG. 3 and FIG. 4, respectively, are exemplary only. It would be a routine undertaking for one skilled in the art having the benefit of this disclosure to add or remove specific operator controls, or rearrange the positions of the various buttons and indicators on the fixed and movable controllers 106, 108.

Some of the functions associated with the exemplary operator buttons and indicators illustrated in the embodiments of the fixed and movable controllers 106, 108 illustrated in FIG. 3 and FIG. 4 are as follows:

Light Controls

Assuming the lights 120, 121 are initially off, pressing the light on/off button (located under the first hinged lid 124 in FIG. 3, and reference 140 in FIG. 4) causes the up and down lights 120, 121 to "ramp-up" to a preset intensity. The lights "ramp-up," in that a given one of the light fixtures increase to the preset intensity, followed by the other light fixture. For example, the up-light 120 may first ramp-up, followed by the down-light 121. This creates an effect of the light moving from the ceiling to the floor of the room in which the ceiling fan 112 is installed. Alternatively, the down-light 121 could ramp-up first, creating an effect of the light moving from the floor to the ceiling. Ramping-up the lights in this manner minimizes the surge on the AC power source 104. A power surge resulting from simultaneously switching on the up-light 120 and the down-light 121 could cause a reduction in the fan speed and noticeably affect the operation of other items on the same household circuit. Activating the light on/off button again causes the lights to turn off.

The light intensity level is set by the light intensity controls 128, 129, 142, 143. Activating the proper button changes the light intensity level as indicated. In the embodiments illustrated in FIG. 3 and FIG. 4, each controller 106, 108 includes a single set of light intensity buttons that control the intensity level for both the up-light and down-light fixtures 120, 121. The fixed and movable controllers 106, 108 each also include a function to select the desired light fixture to be adjusted with the light intensity controls 128, 129, 142, 143. In this manner, each light fixture 120, 121 may be set to a different intensity level. For instance, the intensity for the down-light fixture 121 may be completely turned down, or off, such that only the up-light 120 comes on when the light on/off button is activated.

In the exemplary embodiment of the fixed controller 106 illustrated in FIG. 3, the up/down light select function is performed by a push-button up/down light control 130, together with the up and down light indicators 134, 135, which, in one embodiment, comprise LEDs. Activating the up/down light control 130 toggles between control of the up-light 120 and the down-light 121, and the up and down light indicators 134, 135 show which light fixture is being controlled. The embodiment of the fixed controller illustrated is adapted to fit in a standard wall electrical box. To this end, using the push-button up/down light control 130 and the indicators 134, 135 reduces the space required for achieving the desired controls. Referring now to FIG. 4, the up/down light select switch 158 for the movable controller 108 is set to the up-light or down-light setting, as desired, to control the respective light.

Thus, to preset the light fixtures 120, 121 to a desired level that will be achieved when the lights are turned on, the user first selects which light is to be adjusted. With the exemplary fixed controller 106, when the up-light indicator 134 is lit, the user has control of the up-light 120, and when the down-light indicator 135 is lit, the user has control of the down-light 121. Alternatively, the select switch 158 for the exemplary movable controller 108 is set to the proper position to select the light to be adjusted. Once the user has selected the light to be adjusted, the intensity controls 128, 129, 142, 143 are activated until the light is at the desired level. The user may then switch control to the other light to set the intensity to the desired level. The selected light levels become the preset levels that the lights will turn on to when the light on/off button is activated.

The embodiments of the fixed and movable controllers 106, 108 further include a security function button (located under the second hinged lid 126 in FIG. 3, and reference 156 in FIG. 4). In a particular embodiment of the invention, activating the security function causes the lights to flash, then come on to full brightness. The lights remain on for a random time, then turn off and on at random times, giving the impression that someone is occupying the room or facility in which the ceiling fan 112 is installed. Pushing the light on/off button cancels the security function.

Fan Controls

Activating the fan on/off button (located under the second hinged lid 126 in FIG. 3, and reference 144 in FIG. 4) causes the fan to turn on to a preset speed and direction. Activating the fan on/off button again causes the fan to turn off. One embodiment of the fan includes six different operating speeds, though the present invention may be implemented with a fan capable of operating at any number of speed levels. As with the light controls, the preset fan speed and direction are the direction and speed in effect when the fan was previously turned off. To adjust the speed, the appropriate control 132, 133, 146, 147 is activated. The reverse button (located under the second hinged lid 126 in FIG. 3, and reference 148 in FIG. 4) causes the fan direction to change when the control is activated.

The embodiments of the fixed and movable controllers 106, 108 also include the "sleep" function buttons and the "winter" function buttons (located under the first hinged lid 124 in FIG. 3, and references 150 and 152, respectively, in FIG. 4). The sleep function causes the fan speed to gradually decrease until the fan is off. This allows a user to go to sleep with the fan operating at a desired speed. As the evening progresses, and the temperature falls, the fan speed reduces until the fan turns off. The winter function causes the fan to operate in an up-flow direction at low speed. At predetermined intervals, the fan turns up to a higher speed for a predetermined period, then returns to low speed. In one embodiment, the fan runs at low speed for ten minutes, then increases to full speed for three seconds before returning to low speed.

In accordance with one embodiment of the invention, the fan control system includes a speed sensitive "dynamic" reverse that is activated by the reverse function buttons (located under the second hinged lid 126 in FIG. 3, and reference 148 in FIG. 4). FIG. 5 is a flow diagram illustrating a method of reversing the ceiling fan 112 rotation direction, in accordance with the present invention. Assume the fan 112 is operating at a given power level such that the rotor is turning the blades 114 in a first direction at a desired speed, as indicated in block 170. Upon activation of the reverse button, the ceiling fan 112 receives the instruction to change direction (block 172). In response to receiving the instruction, the rotation direction is changed (block 174), and the power is increased (block 176). In a particular embodiment, the power shuts off for a predetermined time period, for example, two seconds, prior to increasing the power in block 176 to protect the system's electronics. The power level increase may be for a predetermined time period, then the power level is reduced to the power level required to achieve the desired rotation speed. This causes the rotation direction to quickly reverse.

In one particular embodiment, the power is increased to full power upon changing rotation direction, though any increased power level may be used. Further, in one embodiment, the predetermined time period during which the power level is increased is based, at least in part, on the fan speed. For example, if the fan is operating at a low speed when the reverse function is activated, the period of increased power, or power "boost," is relatively short. In comparison, if the fan is operating at a higher speed, the power boost is longer, as it will take longer to reverse the fan when it is operating at a faster speed. In additional embodiments, the power boost may be determined based on additional, or different factors. For example, if a user operates the fixed or movable controller 106, 108 to change both the rotation direction and speed, the power boost period may be determined by the new desired speed, rather than the speed at which the fan was operating prior to initiating the reverse function.

Figure 6:
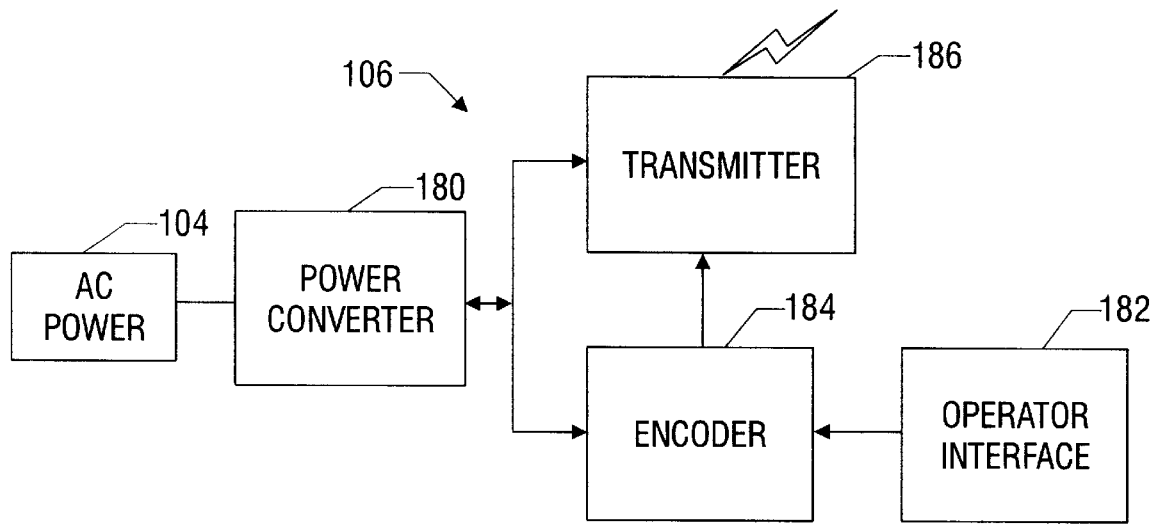
FIG. 6 is a block diagram illustrating an embodiment of a fixed controller in accordance with the present invention.

Turning now to FIG. 6, an embodiment of the fixed controller 106 is illustrated in block diagram form. The fixed controller 106 is connected to the AC power source 104 that powers the device 102, such as the ceiling fan 112. The AC power source may comprise a typical household power source. A power converter 180 receives AC voltage from the AC power source 104 and converts it to DC voltage for powering the fixed controller 106. An operator interface 182 including, for example, operator buttons and indicators as illustrated and disclosed in conjunction with FIG. 3, is coupled to an encoder 184. The encoder 184 converts the input as received via the operator interface 182 into signals that are sent to the ceiling fan 112 (not shown in FIG. 7) via a transmitter 186. In an alternative embodiment, operator commands from the operator interface 182 are provided directly to the transmitter 186, thus eliminating the encoder 184. In one embodiment, the transmitter 186 is adapted to send the control signals to the ceiling fan 112 via a wireless medium, such as RF or infrared.

Powering the fixed controller 106 via the AC power source 104 eliminates the need for a separate DC power source, such as a battery, for powering the fixed controller 106. In one embodiment of the invention, the fixed controller 106 is adapted to fit into a standard wall electrical box. Eliminating the need for one or more batteries reduces the amount of space required for the fixed controller 106.

In one exemplary embodiment, the power converter 180 comprises a half-wave rectifier that receives standard household 120 volt AC power and converts it to approximately 10 volts DC for powering the fixed controller 106. Thus, the power converter 110 only "steals" power from a portion of the ceiling fan power supply, rather than stealing power from both the positive and negative portions of the input AC waveform. Powering the fixed controller 106 in this manner is essentially transparent to the ceiling fan 112 and light fixtures 120, 121, preventing noticeable reductions in fan speed or light brightness resulting from power lost to the fixed controller 106.

Figure 7:
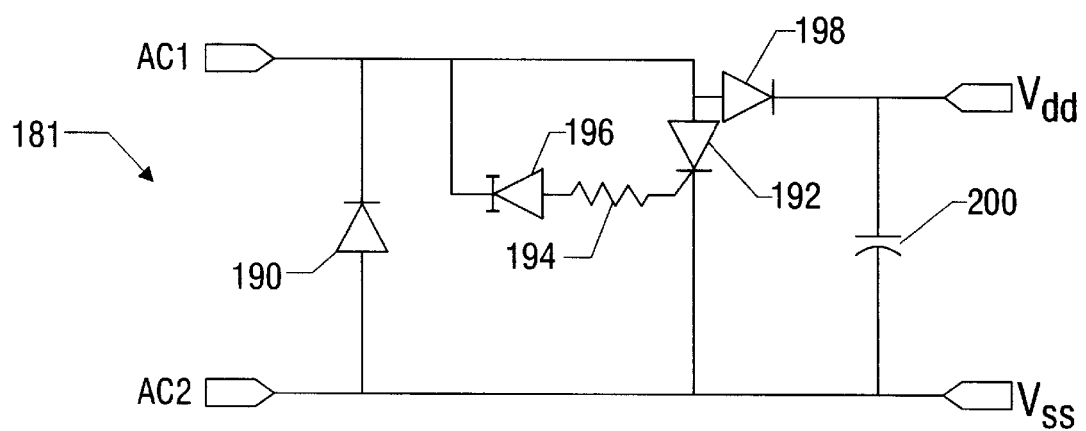
FIG. 7 is a circuit diagram of a power converter in accordance with a particular embodiment of the invention.

FIG. 7 illustrates a circuit diagram of a power converter 181 in accordance with a particular embodiment of the invention. The power converter 181 includes first and second AC input terminals AC1, AC2 that are adapted to be coupled to the AC power source 104 powering the ceiling fan 112. A diode 190 is coupled between the first and second AC input terminals AC1, AC2. As illustrated in FIG. 7, the diode 190 is connected such that it conducts when the first AC input terminal AC1 is negative with respect to the second AC input terminal AC2. Consequently, the power converter 181 only "steals" power from the ceiling fan 112 during the positive portion of the AC input waveform.

First and second DC output terminals, comprising a positive source voltage terminal $V_{dd}$ and a common, or ground terminal $V_{ss}$, are coupled in series with the first and second AC input terminals AC1, AC2, respectively. An SCR 192 is coupled between the first and second AC input terminals AC1, AC2, with its gate terminal coupled to the first AC input terminal AC1 through a resister 194 and a zener diode 196. A diode 198 is coupled in series between the first AC input terminal AC1 and the $V_{dd}$ terminal, and a filter capacitor 200 is coupled between the $V_{dd}$ terminal and the $V_{ss}$ terminal.

The values for the zener diode 196 and the resistor 194 are selected such that the SCR 192 conducts when the voltage at the first AC input terminal AC1 reaches a predetermined level necessary to achieve the desired output DC voltage at the $V_{dd}$ terminal. In one embodiment, the resistor 194 is a 100 ohm resistor, and the filter capacitor 200 is a 220 microfarad capacitor, thus achieving +10 volts DC at the DC output terminals $V_{dd}$, $V_{ss}$, without noticeably affecting the speed of the fan motor 113 or the brightness of the lights 120, 121.

Figure 8:
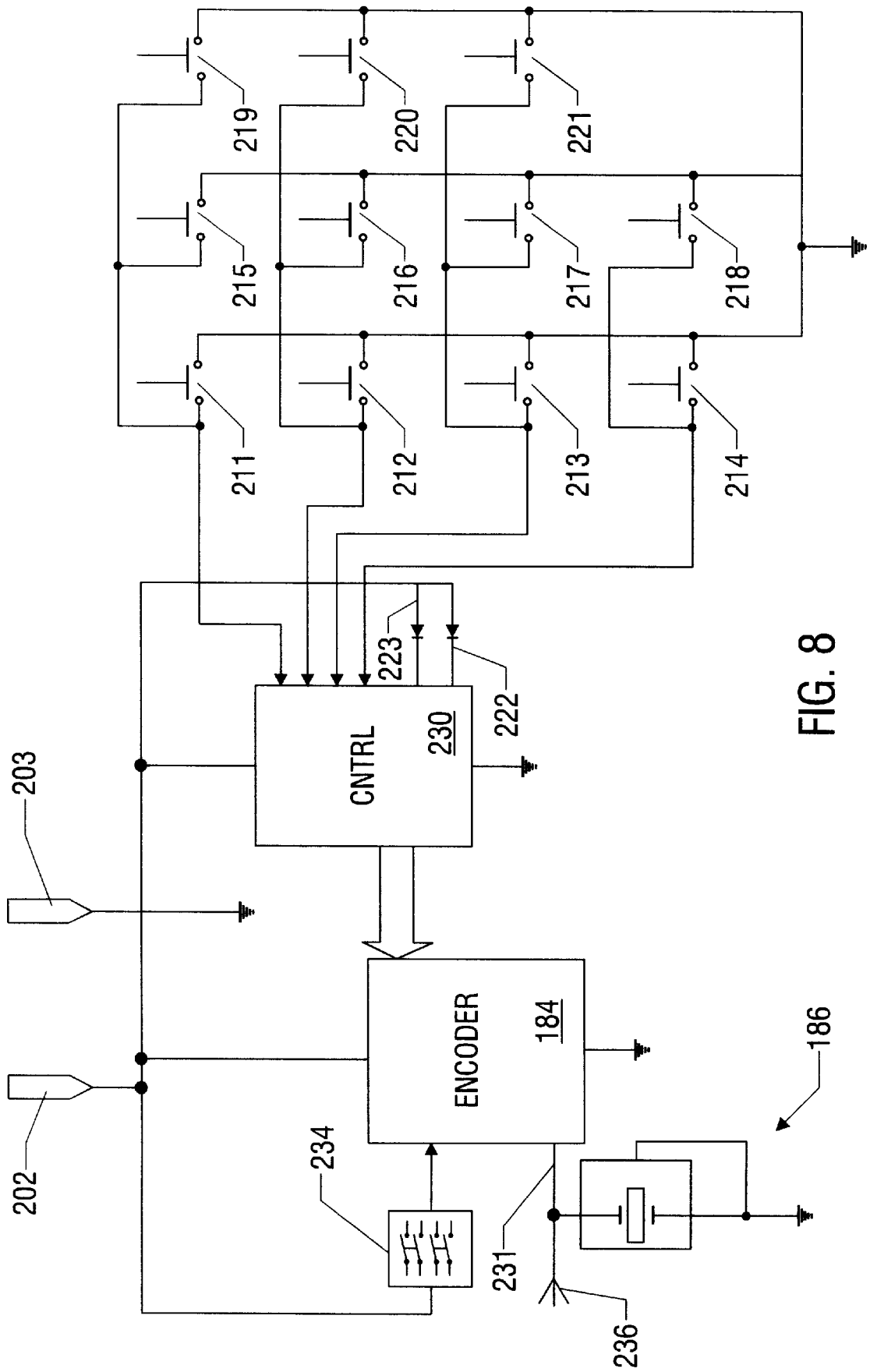
FIG. 8 is a simplified circuit diagram illustrating an operator interface, encoder and transmitter of a control device in accordance with embodiments of the present invention.

FIG. 8 is a simplified block diagram illustrating a circuit embodying the operator interface 182, the encoder 184, and the transmitter 186. Input voltage for the circuit is provided via first and second DC input voltage terminals 202, 203. In the particular embodiment illustrated, the first and second DC input voltage terminals 202, 203 are coupled to the DC output terminals $V_{dd}$, $V_{ss}$ of the power converter 181 illustrated in FIG. 7. The operator interface 182 includes a plurality of push-button switches 211–221, which may correspond to the plurality of buttons on the fixed controller illustrated in FIG. 3. In one embodiment, the push-button switches 211–221 are assigned functions as follows:

| | |
|---|---|
| Switch 211 | Security |
| Switch 212 | Light on/off |
| Switch 213 | Sleep |
| Switch 214 | Light intensity increase |
| Switch 215 | Light intensity decrease |
| Switch 216 | Up/down light select |
| Switch 217 | Fan speed increase |
| Switch 218 | Fan speed decrease |
| Switch 219 | Fan reverse |
| Switch 220 | Fan on/off |
| Switch 221 | Winter |

Two light-emitting diodes (LED) 222, 223 provide the up and down light indicator function, respectively. The push-button switches 211–221 and the LEDs 222, 223 are coupled to a controller 230, which may, for example, comprise a Zilog model Z86E02 microcontroller chip. The outputs of the controller 230 are input into the encoder 184, which outputs a control signal to the transmitter 186 that, in turn, is sent to the receiver 122 to control the ceiling fan 112. In an alternative embodiment, the controller 230 is eliminated by coupling the push-button signals 211–221 directly to the encoder 184, via discrete components (for example, diodes and resistors) arranged convert the user command (as indicated by the push-button switches 211–221) into a unique input signal for the encoder 184.

In the embodiment illustrated in FIG. 8, the encoder 184 comprises a Motorola MC145026 encoder. A four position DIP switch 232 allows a user to input a controller select code that corresponds to the remote select code at the receiver 122. The provision of the DIP switch 232 allows for controlling a single ceiling fan 112 with a plurality of fixed or remote controllers 106, 108, or for controlling multiple ceiling fans located in close proximity with different controllers. The data output terminal 231 of the encoder 184 is coupled to a resonator 234, which is coupled to a transmit antenna 236 for transmitting the control signal to the receiver 122 associated with the ceiling fan 112. In one embodiment, the resonator 234 comprises a SAW resonator, such as a model RO2104 SAW resonator available from RF Monolithics, Inc., and the transmitter 186 operates at 303.825 MHz. In alternative embodiments, the encoder 284 may be eliminated by programming the encoder 284 functions into the controller 230 and providing the output from the controller 230 directly to the transmitter 186.

The movable controller 108 may employ circuits similar to those disclosed in conjunction with FIG. 8 above. The movable controller 108 is powered by a separate DC power source, such as a battery. The embodiment of the movable controller 108 illustrated in FIG. 4 also utilizes a slide switch 158, rather than the combination of the push-button switch 216 and the first and second LEDs 222, 223. Further, the embodiment disclosed in conjunction with FIG. 8 uses RF as its transmission medium. However, it would be a routine undertaking for one skilled in the art having the benefit of this disclosure to reconfigure either, or both, of the fixed and movable controllers 106, 108 to transmit via another wireless medium, such as infrared.

Figure 9:
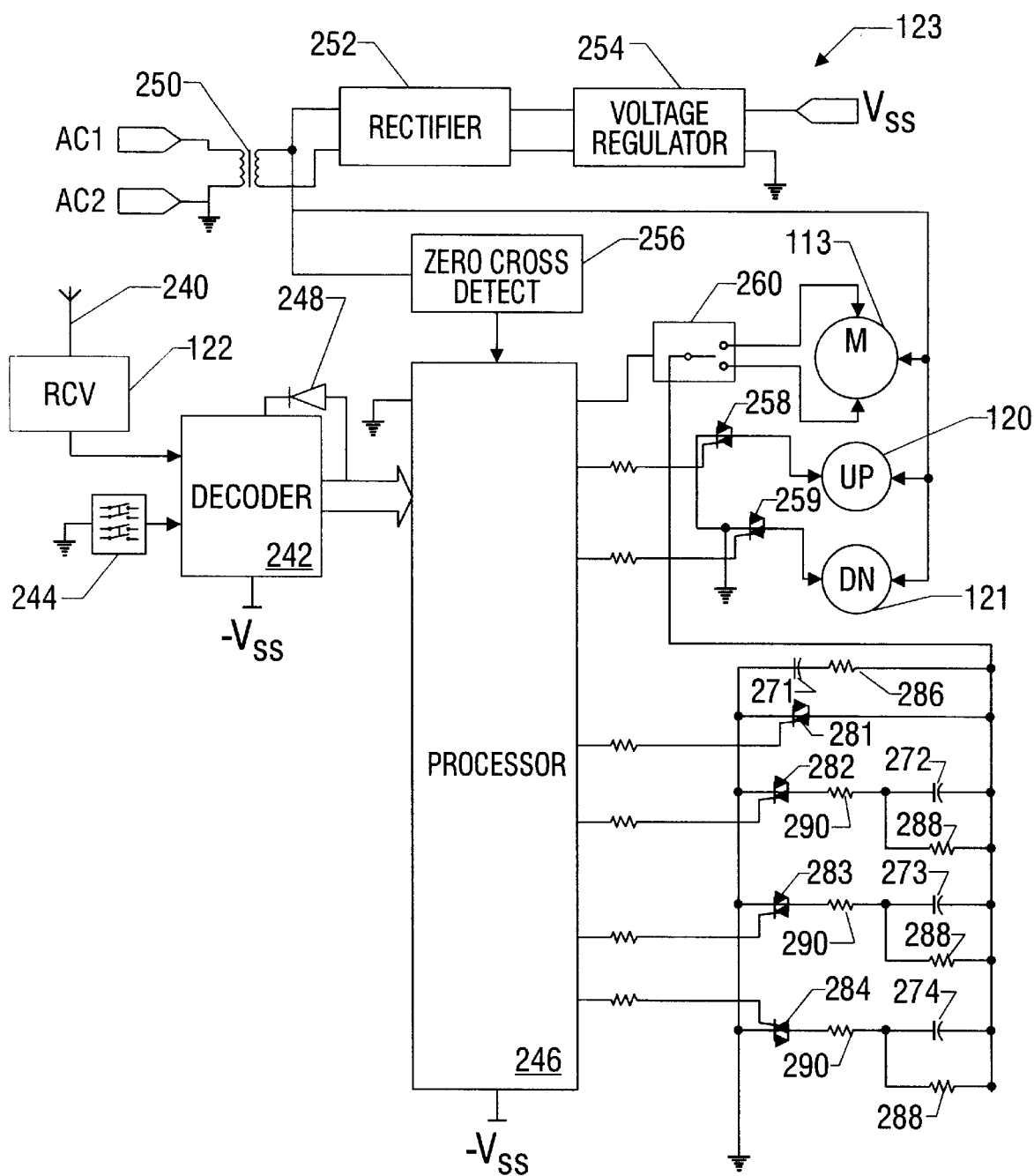
FIG. 9 is a simplified circuit diagram illustrating a ceiling fan control unit in accordance with the present invention.

An exemplary embodiment of the control unit 123 is illustrated in the simplified block diagram of FIG. 9. The control unit 123 is connected to the receiver 122, which receives the control signal sent by the transmitter 186 via an antenna 240. In one embodiment, both the receiver 122 and the control unit 123 are mounted within the canopy of the ceiling fan 112. The receiver 122 in the embodiment illustrated is a standard RF receiver that is configured to receive the 303.825 MHz transmission from the transmitter 186. However, as with the transmitter 186, the receiver 122 may be modified to receive signals transmitted via another wireless medium from the fixed and variable controllers 106, 108, such as infrared.

The received signal is input to a decoder 242 that corresponds to the encoder 184. Thus, in one embodiment, the decoder comprises a Motorola MC145027 decoder. A four position DIP switch 244 corresponds to the DIP switch 232 utilized in the fixed or movable controller 106, 108, and is also coupled to the decoder 242 as an input thereto. The data output of the decoder 242 is input to a processor 246 that is programmed with the control functions. As with the encoder 284, the decoder 242 may be eliminated by programming the decoder functions into the processor 246. A model 16C558 microcontroller available from Microchip Technology, Inc. is a suitable processor 246. The data output of the decoder 242 is also coupled to a piezo transducer 248 that acknowledges receipt of a control signal.

Power is provided to the control unit 123 via the AC power supply 104 at first and second AC input terminals AC1, AC2, which, for example, may comprise standard household 60 Hz 120 volts AC. The AC input terminals AC1, AC2 of the AC power supply 104 are connected to a step-down transformer 250 or other voltage step-down means such as a capacitor, and to a rectifier 252. A voltage regulator 254 is coupled to the rectifier 252 to provide a DC voltage source $-V_{ss}$. In one embodiment, the voltage regulator 254 comprises an LM7905 voltage regulator, and $-V_{ss}$ is –5 volts. A zero-cross detector 256 provides a signal to the processor 246, identifying the time the AC wave of the AC power supply 104 crosses zero.

The up and down lights 120, 121 are coupled across the AC input terminals AC1, AC2 through respective triacs 258, 259. The processor 246 provides trigger pulses to the light triacs 258, 259 to control the intensity of the up and down lights 120, 121. The ceiling fan motor 113 is also coupled across the AC input terminals AC1, AC2 through a reversing relay 260. The reversing relay 260 is coupled to a speed control device, which in the illustrated embodiment, includes a network of speed control capacitors 271–274. According to the desired speed, the processor varies the number of capacitors and thus, the amount of capacitance, coupled in series with the windings of the motor 113. In one embodiment, the capacitors 271, 272, 273 and 274 have values of 0.1, 9, 7, and 4 microfarads, respectively. Controlling motor speed via capacitors is disclosed in detail in U.S. Pat. No. 4,408,150 by Holston et al., which is assigned to Emerson Electric Co., the assignee of the present application. The entire contents of U.S. Pat. No. 4,408,150 is incorporated by reference herein in its entirety.

In the illustrated embodiment, four triacs 281–284 are fired by the processor 246 to control the number of capacitors 271–274 coupled to the motor 113. The speed control capacitor 271 has a resistor 286 coupled in series therewith, and the remaining speed control capacitors 272, 273, 274 each have a resistor 288 coupled in parallel therewith for discharging the respective capacitor 271–274 when it is decoupled from the motor 113. In one embodiment, resistor 286 is a 100Ω resistor, and resistors 288 each are 33kΩ resistors. The triacs 282, 283, 284 and the corresponding speed control capacitors 272, 273, 274 each have a resistor 290 coupled in series therebetween to limit the initial current flow through the respective triac 282, 283, 284 when it is fired by the processor 246, extending the life of the triac 282, 283, 284. In an exemplary embodiment, the resistors 290 are 4.7Ω resistors.

In a particular embodiment, the processor 246 is programmed to provide triggering pulses to the triacs 281–284. Triggering the motor control triacs 281–284 by pulses rather than constant logic level voltages to the gates of the triacs 281–284 reduces the amount of current consumed in the system, and thus, allows for use of a smaller power supply. In the embodiment illustrated in FIG. 9, the processor 246 operates the motor 113 at six different speeds by controlling the four triacs 281–284. In a specific embodiment, the up and down light triacs 258, 259 comprise BTA08-600S sensitive gate triacs, and the motor control triacs 281–284 comprises BTA06-600S sensitive gate triacs, available from STMicroelectronics.

In one embodiment, the processor 246 is programmed to turn off the triacs 281–284 to remove power from the fan motor 113 for a predetermined time period, for example, one second, prior to switching the relay 260. This prevents arcing the contacts of the relay 260 and allows use of a smaller relay 260 than in conventional implementations. In accordance with the method of reversing fan direction disclosed in conjunction with FIG. 5, following the predetermined time period, the relay 260 is activated by the processor 246 to reverse the rotation direction, then the appropriate motor control triacs 281–284 are fired to provide the increased power level to the motor 113 to quickly reverse the rotation direction of the fan blades 114.

It will be appreciated by those of ordinary skill in the art having the benefit of this disclosure that the embodiment illustrated above is capable of numerous variations without departing from the scope and spirit of the invention. It is fully intended that the invention for which a patent is sought encompasses within its scope all such variations without being limited to the specific embodiment disclosed above. Accordingly, the exclusive rights sought to be patented are as described in the claims below.

What is claimed is:

1. A control system for a device powered by an AC power source, the control system comprising:
    a fixed controller adapted to be wall-mounted, the fixed controller adapted to be powered by the AC power source and transmit control signals to the device via a transmission medium; and
    at least one movable controller adapted to be powered by a DC power source and transmit control signals to the device via the same transmission medium as the fixed controller.

2. The control system of claim 1 wherein the transmission medium comprises RF.

3. The control system of claim 1 wherein the transmission medium comprises infrared.

4. The control system of claim 1, wherein the device includes a plurality of functional units, and wherein the movable and fixed control devices are adapted to control the plurality of functional units.

5. The control system of claim 4, wherein the plurality of functional units includes a ceiling fan and at least one light fixture.

6. The control system of claim 5, wherein at least one light fixture comprises an up-light module adapted to cast light generally above the ceiling fan, and a down-light module adapted to cast light generally below the ceiling fan.

7. The control system of claim 6, wherein the movable and fixed control devices each include an indication of which light module is being controlled.

8. The control system of claim 6 wherein the indication comprises a slide switch.

9. The control system of claim 6 wherein the indication comprises an LED.

10. The control system of claim 1, wherein the fixed controller includes:
    a first hinged lid coupled to a surface of the fixed controller for pivotal movement thereon;
    a plurality of switches situated on the surface;
    the first hinged lid being movable by a user to a first position to expose the switches;
    the first hinged lid being movable by a user to a second position to cover the switches; and
    the first hinged lid being adapted to activate one of the plurality of the switches when the first hinged lid is pushed by a user.

11. A method of controlling a ceiling fan including a motor having a stator, a rotor, and a plurality of blades mounted to the rotor so as to rotate therewith, the method comprising:
    rotating the rotor in a first direction at a first power level;
    receiving an instruction to rotate the rotor in a second direction; and
    rotating the rotor in the second direction at a second power level that is greater than the first power level.

12. The method of claim 11 further comprising rotating the rotor in the second direction at the second power level for a predetermined time period.

13. The method of claim 11 wherein rotating the rotor in the second direction at a second power level comprises rotating the rotor the second direction at full power.

14. The method of claim 11 further comprising removing power from the motor for a predetermined time period prior to rotating the rotor in the second direction.

15. The method of claim 12 further comprising:
    receiving an instruction to rotate the rotor in the second direction at a third power level; and
    rotating the rotor in the second direction at the third power level following the predetermined time period.

16. The method of claim 12 wherein the predetermined time period is based at least in part on the first power level.

17. The method of claim 15 wherein the predetermined time period is based at least in part on the third power level.

18. The method of claim 11 wherein receiving the instruction to rotate the rotor in a second direction further comprises receiving the instruction transmitted from at least one of a fixed controller or a movable controller via a wireless transmission medium.

19. A fixed controller for a ceiling fan powered by an AC power source, comprising:
    a power converter adapted to receive AC power from the AC power source and supply DC power to the fixed controller; and
    a transmitter adapted to send wireless control signals to the ceiling fan.

20. The fixed controller of claim 19 wherein the power converter comprises a half-wave rectifier.

21. A method for remotely controlling a ceiling fan including at least one light fixture, comprising:
    powering the ceiling fan from an AC power source;
    powering a first controller from the AC power source; and
    transmitting control signals from the first controller to the ceiling fan via a wireless transmission medium.

22. The method of claim 21, further comprising:

powering a second controller from a DC power source; and transmitting control signals from the second controller to the ceiling fan via the wireless transmission medium.

23. The method of claim 21, wherein powering the first controller from the AC power source includes applying an AC voltage from the AC power source to a half-wave rectifier.

24. A remote control unit for controlling a ceiling fan including at least first and second light fixtures, the remote control unit comprising:

a first switch for selecting one of the first or second light fixtures for control;

a device that indicates which one of the first or second light fixtures is being controlled; and a second switch operable to control both the first and second light fixtures as selected via the first switch.

25. The remote control unit of claim 24, wherein the first and second light fixtures comprise an up-light module adapted to cast light generally above the ceiling fan, and a down-light module adapted to cast light generally below the ceiling fan, respectively.

26. The remote control unit of claim 24, wherein the switch comprises a push-buttton switch.

27. The remote control unit of claim 24, wherein the switch comprises a slide switch.

28. The remote control unit of claim 24, wherein the device comprises at least one LED.

29. The remote control unit of claim 24, wherein the remote control unit is movable.

30. The remote control unit of claim 24, wherein the remote control unit is fixed.

31. A ceiling fan system, comprising:

a ceiling fan including a motor, the motor having a stator and a rotor adapted to rotate relative to the stator, the motor adapted to be coupled to an AC power source;

a plurality of blades coupled to the rotor so as to rotate therewith;

first and second light fixtures coupled to the AC power source;

a control unit coupled to the motor and the light fixtures, the control unit adapted to receive control signals indicating operating parameters for the motor and light fixtures and control operation of the motor and the light fixtures in accordance with the received control signals;

a fixed controller adapted to be wall-mounted and powered by the AC power source and transmit the control signals to the receiver via a transmission medium; and at least one movable controller adapted to be powered by a DC power source and transmit the control signals to the receiver via the same transmission medium as the fixed controller.

32. The ceiling fan system of claim 31, wherein the transmission medium comprises RF.

33. The ceiling fan system of claim 31, wherein the transmission medium comprises infrared.

34. The ceiling fan system of claim 31, wherein the first and second light fixtures comprise an up-light fixture and a down-light fixture.

35. The ceiling fan system of claim 31, wherein the control unit includes a plurality of capacitors and a device adapted to couple and decouple preselected capacitors to the motor to vary the speed of the motor.

36. The ceiling fan system of claim 35, wherein the device includes a processor coupled to a plurality of triacs, the processor operable to fire the triacs to couple and decouple preselected capacitors to the motor in response to the control signals.

37. The ceiling fan system of claim 35, further comprising a plurality of resistors coupled to the capacitors so as to discharge the capacitors when the capacitors are decoupled from the motor.

38. The ceiling fan system of claim 36, further comprising a plurality of resistors coupled to the triacs so as to limit the current flow through the triacs when the triacs are fired by the processor.

39. The ceiling fan system of claim 36, wherein the plurality of capacitors comprises four capacitors and the plurality of triacs comprises four triacs, and wherein the triacs are controlled by the processor so as to operate the motor at six predetermined speeds.

* * * * *